United States Patent [19]

Dezelan

[11] 4,217,968
[45] Aug. 19, 1980

[54] CLOSED CENTER EMERGENCY STEERING WITH ACCUMULATOR SOURCE

[75] Inventor: Joseph E. Dezelan, Western Springs, Ill.

[73] Assignee: Caterpillar Tractor Co., Peoria, Ill.

[21] Appl. No.: 948,370

[22] Filed: Oct. 4, 1978

[51] Int. Cl.² .................................................. B62D 5/08
[52] U.S. Cl. ....................................... 180/133; 60/404; 137/102
[58] Field of Search ................... 180/132, 133; 60/403, 60/404, 405, 417, 425, 582, 413; 137/102, 568, 109, 110, 118

[56] References Cited

U.S. PATENT DOCUMENTS

| | | | |
|---|---|---|---|
| 2,396,984 | 3/1946 | Broadston | 60/404 |
| 3,123,174 | 3/1964 | Bednar | 180/133 |
| 3,458,998 | 8/1969 | Bishop | 180/133 |
| 3,570,519 | 3/1971 | Bianchetta | 137/101 |
| 3,613,818 | 10/1971 | Schubert | 180/133 |
| 3,882,952 | 5/1975 | Crabb | 180/133 |
| 3,905,438 | 9/1975 | Runyon | 180/133 |
| 3,918,847 | 11/1975 | Junck | 417/288 |
| 3,952,510 | 4/1976 | Peterson | 60/403 |
| 4,114,720 | 9/1978 | Ericson | 60/405 |

*Primary Examiner*—John J. Love
*Assistant Examiner*—Randall A. Schrecengost
*Attorney, Agent, or Firm*—Phillips, Moore, Weissenberger, Lempio & Majestic

[57] ABSTRACT

An improved emergency system (10) for a vehicle having a closed center steering valve (12), a pump (14) normally supplying fluid to the valve, and an accumulator (16) for supplying emergency pressurized fluid to the valve when the pump fails. The improvement is a flow directing circuit (18) connecting the accumulator to the valve in parallel relationship to the pump and apparatus for blocking flow from the accumulator to the valve responsive to proper operation of the pump. Adequate emergency steering is provided to a closed center steering valve system by the above arrangement.

6 Claims, 2 Drawing Figures

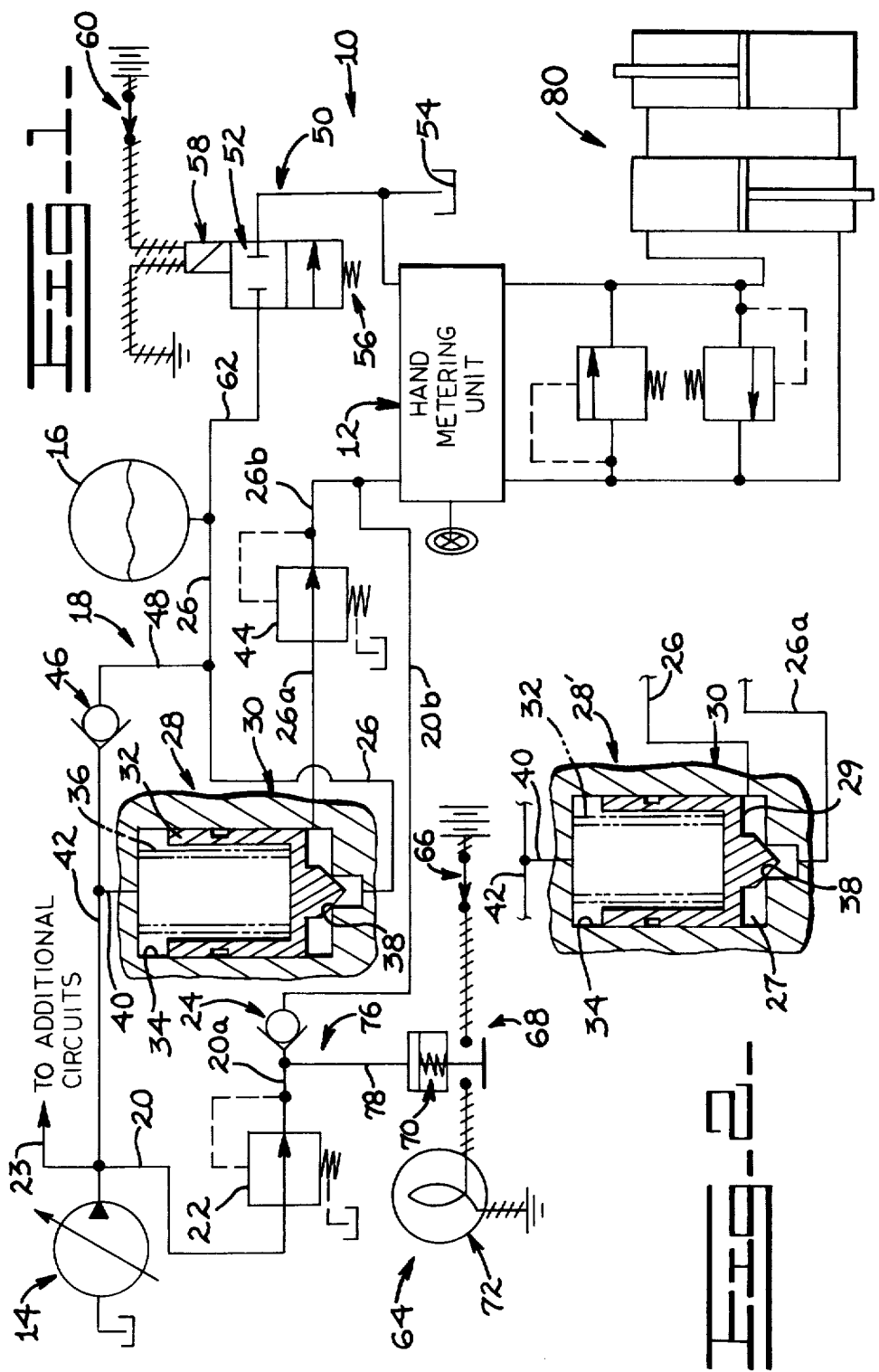

CLOSED CENTER EMERGENCY STEERING WITH ACCUMULATOR SOURCE

TECHNICAL FIELD

This invention relates to a system for providing pressurized fluid from an accumulator to a closed center valve.

BACKGROUND ART

In the event that a vehicle has hydraulically motivated power steering and that the engine on the vehicle stops or the pump supplying the hydraulic pressure fails for any reason, the vehicle will continue moving due to its momentum or from its normal operating transmission. Because the steering is hydraulically actuated, it is essential that steering control be retained. In systems wherein the steering is provided via an open centered steering valve, accumulators have been utilized which are charged by the pump when it is operating and which discharge fluid to the steering valve when the pump fails. Examples of such systems are found in U.S. Pat. No. 3,882,952 issued May 13, 1975 to E. R. Crabb, and U.S. Pat. No. 3,458,998 issued Aug. 5, 1969 to A. E. Bishop.

Such systems as have been used with open centered control valves have not, however, been readily adaptable for use with closed center control valves. Thus, with closed center control valves, auxiliary wheel driven pumps such as those taught in U.S. Pat. No. 3,613,818 issued Oct. 19, 1971 to G. E. Schubert, et al. and in U.S. Pat. No. 3,952,510 issued Apr. 27, 1976 to W. A. Peterson, have been utilized to supply pressure to the control valve when the engine and/or main pump have failed. It is clear that as the vehicle rolls the wheels are turned and, hence, the auxiliary pumps are turned to supply the required emergency pressure. This is, however, a relatively expensive solution to the problem of retaining control in an emergency situation, and, since it utilizes an extra pump, it introduces the possible problem of failure of this extra pump. Thus, a fully adequate and inexpensive solution to the problem of providing emergency steering does not necessarily result from utilizing a wheel-driven pump.

Accumulators have been utilized with closed centered steering valves to supply power thereto when the main pump fails. For example, U.S. Pat. No. 3,570,519 issued Mar. 16, 1971 to D. L. Bianchetta and U.S. Pat. No. 3,918,847 issued Nov. 11, 1975 to J. A. Junck, et al., both disclose such systems. The systems as disclosed in the two just mentioned patents, however, have both the pump and accumulator operating on the same line and through a single reducing valve to supply pressure to the closed centered steering valve. Since the accumulator and pump are in the same line, the accumulator pressure is always as high as that in the pump. Thus, when the pump fails the operator of the vehicle does not feel an immediate sharp difference in steering, but instead only feels a gradual deterioration thereof. Accordingly, should warning lights or the like fail to properly indicate when pump operation has been retarded or stopped, the vehicle operator may not receive sufficient immediate warning to allow him to steer the vehicle to a safe stopping place.

DISCLOSURE OF THE INVENTION

The present invention is directed to overcoming one or more of the problems as set forth above by providing an improvement in an emergency system of a vehicle.

In one aspect of the invention, an improvement is provided in an emergency system for a vehicle having a closed center valve, a pump normally supplying pressurized fluid to the valve and an accumulator for supplying pressurized fluid to the valve when the pressure of the pump supplied fluid drops below a predetermined value. The improvement comprises a flow circuit connecting the accumulator to the closed center valve in parallel relationship to the pump means for blocking flow from the accumulator to the valve responsive to the pressure of the pump supplied fluid being above the predetermined value.

BRIEF DESCRIPTION OF THE DRAWING

Other objects of this invention will become apparent from the following description and accompanying drawing wherein:

FIG. 1 is a primarily schematic, partially sectioned view of an emergency system incorporating an improvement in accordance with an embodiment of the present invention; and FIG. 2 is a partial view of an alternate blocking valve arrangement wherein all non shown portions of the systems are as in FIG. 1.

BEST MODE FOR CARRYING OUT THE INVENTION

FIG. 1 illustrates an emergency system 10 in accordance with the present invention. Such a system is useful for a vehicle having a closed center valve 12, commonly referred to as a hand metering unit, and which may be used for controlling steering of the vehicle. A closed center valve is one which blocks flow thereat when it is in the closed position rather than directing that flow therethrough to a sump or other reservoir. A pump 14, which may be of the variable displacement type, normally supplies pressurized fluid to the closed center valve 12 in a manner which will be shortly explained. An accumulator 16 is part of the circuit and serves for supplying pressurized fluid to the closed center valve 12 when the pressure of the pump supplied fluid drops below a predetermined value.

A flow circuit 18 is provided which connects the accumulator 16 to the closed center valve 12 in parallel relationship to the pump 14. Tracing flow from the pump 14 to the closed center valve 12, it will be noted that this proceeds via a conduit 20 to a first pressure reducing valve 22 which reduces pressure from the pump to a first selected value. For example, pressure from the pump 14 may be delivered at 2000 psi, or selectively at 2000 psi or 3500 psi, whereas the pressure reducing valve 22 will reduce that pressure to 1350 psi. This allows the higher pressure fluid to be supplied to additional circuits which may require such higher pressure fluid via a conduit 23. The pressure at 1350 psi from the first pressure reducing valve 22 will then be applied via conduit 20a, a check valve 24 and then via conduit 20b to the closed center valve 12. It will be noted that pressure is then supplied from the pump 14 to the closed center valve 12 at a pressure of, for example, 1350 psi. The accumulator 16 is meanwhile blocked off from the closed center valve 12.

Pressurized fluid from the accumulator 16 is applied via a conduit 26 to flow blocking means 28, comprising a blocking valve 30, which in the embodiment illustrated includes a spool 32 slidingly fitting with a bore 34. A spring 36 served to mechanically bias the blocking valve 30 towards a flow blocking position thereof. The spool 32 is shown as sitting against a seat 38 of the flow blocking valve 30. In FIG. 1, the conduit 26 serves to deliver pressurized fluid from the accumulator 16 to the seat 38 of the blocking valve 30. A branch conduit 40 supplies fluid from the pump 14 in a direction for adding a force to that supplied by the spring 36 to force the spool 32 of the blocking valve 30 against the seat 38 thereof. The pressurized fluid from the pump 14 enters the branch conduit 40 from an accumulator charging conduit 42. The sum of the forces produced by the spring 36 and the pressure of the pump supplied fluid is greater than the force supplied by the accumulator supplied fluid in the conduit 26. Thus, so long as the pump 14 is properly operating, the blocking valve 30 is in the condition shown in FIG. 1.

When the pump 14 fails, the force determined by the accumulator supplied pressure via the conduit 26 upon the bottom of the spool 32 exceeds that of the spring 36, so long as said accumulator supplied fluid pressure is at a pressure sufficient to control steering of the vehicle. Thus, the spool 32 is forced upwardly and off of the seat 38 allowing flow of pressurized fluid from the accumulator 16, via the conduit 26, passed the seat 38 and into an accumulator flow path continuation conduit 26a.

The pressurized fluid delivered to the conduit 26a then flows through a second pressure reducing valve 44 which serves for reducing the pressure from the accumulator to a second selected value, for example 900 psi, which second selected value is in any event normally less than the first selected value of pressure which exits the first pressure reducing value 22. Fluid exiting the second pressure reducing valve 44 then passes via a conduit 26b to the closed center valve 12.

It should be noted that if the pump 14 fails, there is a sudden decrease in operating pressure delivered to the closed center valve 12, for example from 1350 psi to 900 psi. Thus, the vehicle operator can immediately feel a significant change in operating characteristics. Generally, the second pressure reducing valve 44 will be adjusted so as to provide sufficient pressure, in conjunction with moderate operator input, to operate the closed center valve 12 whereby maximum operating time can be obtained from a minimum volume of fluid in the accumulator 16.

Turning now to charging of the accumulator 16, it is noted that the conduit 42 conducts fluid from the pump 14 passed a check valve 46, then via a conduit 48 and the previously mentioned conduit 26 to the accumulator 16. The conduit 42 is connected upstream of both the first pressure reducing means 22 and the second pressure reducing means 44 so that the accumulator can be charged to substantially the full operating pressure supplied by the pump 14.

In order to avoid having pressure in the accumulator 16 when the vehicle is turned off, blead down means 50 is provided for bleeding down the accumulator 16 responsive to shutting off the vehicle. In the embodiment illustrated the preferred blead down means includes a bleed down valve 52 having one position wherein it is open to a sump 54 and a second position wherein it is blocked. In FIG. 1, the bleed down valve 52 is illustrated in its blocked position. Biasing means 56, schematically illustrated as a spring, serve for normally biasing the bleed down valve 52 into its open to sump position. Solenoid means 58 are provided for producing a force, when activated, to overcome the biasing means 56 and propel the bleed down valve 52 into the illustrated blocked position thereof. Activating means 60, in the embodiment illustrated a switch, is provided for activating the solenoid means responsive to the vehicle being in a switched on condition. Basically, the activating means 60 complete the circuit for the solenoid means 58 whenever the vehicle is turned on. It is clear then that when the activating means 60 are deactivated by turning off of the vehicle, the biasing means 56 force the valve 52 upwardly and allow the reservoir 16 to drain to sump via a conduit 62.

While the operator of the vehicle can quickly perceive when the vehicle has been switched to accumulator pressure by the change in steering characteristics thereof, it is desirable to also set off a visual and/or an auditory alarm to further catch the operator's attention. To accomplish this, an electrically operated alarm circuit 64 can be provided which is switched on when the vehicle is switched on. A switch 66 serves to switch on and off the electrically operated alarm circuit 64 responsive to switching on and off of the vehicle. A breaker switch 68 is provided in the alarm circuit 64. Biasing means 70 serve to bias the breaker switch 68 normally into a closed or complete circuit position whereby an indicator, such as a lamp 72, is activated. Means 76 are provided for overcoming the biasing means 70 to open the breaker switch 68 responsive to the pressure of the pump supplied fluid being above its predetermined value. Briefly, a branch conduit 78 is provided which connects with the conduit 20a downstream of the first pressure reducing valve 22. When the pressure is at, for example, 1350 psi, or whatever other pressure the first pressure reducing valve 22 is set for, then the pressure in the branch conduit 78 is sufficient to open the breaker switch 68 and place it in the position shown in FIG. 1. If the pump 14 fails, then the pressure in the conduit 20a drops. The pressure therein is then not sufficient to keep the breaker switch 68 in its illustrated open position, and the biasing means 70 forces the breaker switch 68 into its closed position whereby the lamp 72 is lit.

FIG. 2 EMBODIMENT

FIG. 2 illustrates an emergency system 10 identical to that of FIG. 1 with the sole exception being in the substitution of flow blocking means 28' for flow blocking means 28. The actual blocking valve 30 can be identical to to that used in the FIG. 1 embodiment. Briefly, pressurized fluid from the accumulator 16 is applied via the conduit 26 to a chamber 27 of the blocking valve 30. The chamber 27 communicates with the seat 38 of the blocking valve 30. The sum of the mechanical biasing force from the spring 36 plus the force due to pressure supplied by the pump 14 via conduit 42 and branch conduit 40, exceeds the force due to pressure supplied by the accumulator 16 acting on an annular area 29 of the blocking valve 30 when the pump 14 is supplying pressurized fluid at a predetermined value, e.g., 1350 psi. Should the pump fail to supply pressurized fluid at or above this predetermined value, the blocking valve 30 opens as the spool 32 thereof moves upwardly and flow proceeds downwardly passed the valve seat 38 and into the accumulator flow path continuation conduit 26a and thence to the pressure reducing valve 44.

INDUSTRIAL APPLICABILITY

In normal operation, the pump 14 charges the accumulator 16 and at the same time provides pressure via conduit 20, first pressure reducing valve 22, conduit 20a, and conduit 20b to closed centered valve 12 which may control, for example, a conventional steering system shown schematically at 80. The breaker switch 68 is open due to the pressure in conduit 20a and flow from the accumulator 16 is blocked by the flow blocking means 28 or 28'. The bleed down valve 52 is in its closed position since the vehicle switch is on.

Assuming that the pump 14 fails, the breaker switch 68 closes because of lack of pressure in conduit 20a and, hence, in the branch conduit 78 thus turning on the light 72. The bleed down valve 52 remains shut. The flow blocking means 28 or 28' opens because of lack of sufficient pressure in the branch conduit 40. Pressurized fluid then proceeds from the accumulator 16 via the conduits 26 and 26a and passed the second pressure reducing valve 44 and via the conduit 26b to the closed center valve 12. The operator can control the vehicle and immediately feels a change in steering characteristics on failure of the pump 14, since, the second pressure reducing valve 44 generally reduces the pressure to a lower value than does the first pressure reducing valve 22. The vehicle operator can then drive the vehicle, for example, a motor grader, to a safe parking position. As soon as the engine is turned off, the solenoid 58 is deactivated and the bleed down valve 50 opens allowing the pressure in the accumulator to be bleed back to the sump 54.

Other aspects, objects and advantages of this invention can be obtained from a study of the drawing, the disclosure and the appended claims.

What is claimed is:

1. In an emergency system (10) for a vehicle having a closed center valve (12), said valve (12) blocking flow thereat when in the closed position, a pump (14) normally supplying pressurized fluid to said valve (12), and an accumulator (16) for supplying pressurized fluid to said valve (12) when the pressure of said pump supplied fluid drops below a predetermined value, the improvement comprising:

first pressure reducing means (22) for reducing the pressure from said pump (14) to a first selected value;

second pressure reducing means (44) for reducing the pressure of said accumulator (16) to a second and lower selected value;

means (26,42,46) for communicating flow from said pump (14) towards said accumulator (16) and preventing reverse flow; and means (28) for blocking flow from said accumulator to said valve (12) in response to the pressure of said pump supplied fluid being above said predetermined value.

2. In an emergency system (10) for a vehicle having a closed center valve (12), said closed center valve (12) blocking flow thereat when in the closed position, a pump (14) normally supplying pressurized fluid to said closed center valve (12), and an accumulator (16) for supplying pressurized fluid to said closed center valve (12) when the pressure of said pump supply fluid drops below a predetermined value, the improvement comprising:

a flow circuit (18) connecting said accumulator (16) to said closed center valve (12) in parallel relationship to said pump, said flow circuit (18) having first pressure reducing means (22) for reducing the pressure from said pump (14) to a first selected value, second pressure reducing means (44) for reducing the pressure from said accumulator (16) to a second and lower selected value, a conduit (42,26) communicating said pump to said accumulator upstream of said first and second pressure reducing means, and check valve means (46) in said conduit (42,26) allowing flow from said pump (14) to said accumulator (16) and preventing reverse flow; and means (28) blocking flow from said accumulator to said closed center value (12) responsive to the pressure of said pump supplied fluid being above said predetermined value.

3. The improvement as in claim 2, wherein said flow blocking means (28) includes:

a blocking valve;

means (36) for mechanically biasing said blocking valve (30) towards a flow blocking position thereof;

means (40) for adding a force determined by the pressure of said pump supplied fluid in said conduit (42) on the pump side of said check valve means (46) to that of said mechanical biasing means (36), means (26) for opposing a force determined by the pressure of said accumulator supplied fluid to that of said mechanical biasing means (36), said accumulator supplied fluid pressure determined force exceeding that of said mechanical biasing means (36) when the pressure of the accumulator supplied fluid is sufficient to control steering of the vehicle, said accumulator supplied fluid pressure determined force being less than the sum of said mechanical biasing means determined force plus said pump pressure determined force when said pump (14) is supplying fluid at a pressure above said predetermined value.

4. The improvement as in claim 3, including:

means (50) for bleeding down the accumulator (16) responsive to shutting off of the vehicle.

5. The improvement as in claim 4, wherein said bleeding down means (50) includes a bleed down valve (52) having open-to-sump and blocked positions, means (56) for biasing said bleed down valve (52) into said open-to-sump position thereof; solenoid means (58) for producing a force, when activated, overcoming said biasing means (56) and propelling said bleed down valve (52) into said blocked position thereof; and means (60) for activating said solenoid means (58) responsive to said vehicle being in a switched on condition.

6. The improvement as in claim 2, including:

an electrically operated alarm circuit (64) which is switched on when the vehicle is switched on;

a breaker switch (68) is said alarm circuit (64);

means (70) for biasing said breaker switch (68) into a normally closed position thereof; and means (76) for overcoming said biasing means (70) to open said breaker switch (68) responsive to the pressure of said pump supplied fluid being above said predetermined value.

* * * * *